United States Patent
DeKoning et al.

(10) Patent No.: US 8,595,397 B2
(45) Date of Patent: Nov. 26, 2013

(54) STORAGE ARRAY ASSIST ARCHITECTURE

(75) Inventors: Rodney A. DeKoning, Wichita, KS (US); Bret S. Weber, Wichita, KS (US); William Patrick Delaney, Wichita, KS (US); Kenneth F. Day, Tucson, AZ (US)

(73) Assignee: Netapp, Inc, Sunnyvale, CA (US)

( * ) Notice: Subject to any disclaimer, the term of this patent is extended or adjusted under 35 U.S.C. 154(b) by 240 days.

(21) Appl. No.: 12/481,303

(22) Filed: Jun. 9, 2009

(65) Prior Publication Data

US 2010/0312963 A1 Dec. 9, 2010

(51) Int. Cl.
*G06F 13/12* (2006.01)
*G06F 1/00* (2006.01)

(52) U.S. Cl.
USPC ............... 710/62; 710/63; 710/306; 713/310; 713/330

(58) Field of Classification Search
USPC .......................................................... 710/62
See application file for complete search history.

(56) References Cited

U.S. PATENT DOCUMENTS

| | | | |
|---|---|---|---|
| 6,430,686 B1* | 8/2002 | Cargemel et al. | 713/1 |
| 2003/0097607 A1* | 5/2003 | Bessire | 714/5 |
| 2003/0101228 A1* | 5/2003 | Busser et al. | 709/214 |
| 2004/0193736 A1* | 9/2004 | Galloway | 710/1 |
| 2005/0114557 A1* | 5/2005 | Arai et al. | 710/5 |
| 2005/0240582 A1* | 10/2005 | Hatonen et al. | 707/6 |
| 2006/0136688 A1* | 6/2006 | Pang et al. | 711/162 |
| 2007/0124407 A1* | 5/2007 | Weber et al. | 709/212 |
| 2007/0162592 A1* | 7/2007 | Marks et al. | 709/224 |
| 2008/0126616 A1* | 5/2008 | Kumasawa et al. | 710/42 |

* cited by examiner

*Primary Examiner* — Henry Tsai
*Assistant Examiner* — Dean Phan
(74) *Attorney, Agent, or Firm* — Haynes and Boone LLP

(57) ABSTRACT

Disclosed is a storage system architecture. An Environmental service module (ESM) is coupled to one or more array controllers. The ESM is configured with a central processing unit and one or more assist functions. The assist functions may include nonvolatile memory. This nonvolatile memory may be used for write caching, mirroring data, and/or configuration data. The assist functions, or the ESM, may be controlled by the array controllers using SCSI or RDMA commands.

13 Claims, 3 Drawing Sheets

STORAGE ARRAY ASSIST ARCHITECTURE

BACKGROUND OF THE INVENTION

Mass storage systems continue to provide increased storage capacities to satisfy user demands. Photo and movie storage, and photo and movie sharing are examples of applications that fuel the growth in demand for larger and larger storage systems.

A solution to these increasing demands is the use of arrays of multiple inexpensive disks. These arrays may be configured in ways that provide redundancy and error recovery without any loss of data. These arrays may also be configured to increase read and write performance by allowing data to be read or written simultaneously to multiple disk drives. These arrays may also be configured to allow "hot-swapping" which allows a failed disk to be replaced without interrupting the storage services of the array. Whether or not any redundancy is provided, these arrays are commonly referred to as redundant arrays of independent disks (or more commonly by the acronym RAID). The 1987 publication by David A. Patterson, et al., from the University of California at Berkeley titled "A Case for Redundant Arrays of Inexpensive Disks (RAID)" discusses the fundamental concepts and levels of RAID technology.

RAID storage systems typically utilize a controller that shields the user or host system from the details of managing the storage array. The controller makes the storage array appear as one or more disk drives (or volumes). This is accomplished in spite of the fact that the data (or redundant data) for a particular volume may be spread across multiple disk drives.

SUMMARY OF THE INVENTION

An embodiment of the invention may therefore comprise an offload environmental service module (ESM), comprising: an input/output controller (IOC) configured as a serial attached SCSI (SAS) target; the IOC comprising a CPU and a non-volatile memory and configured to perform at least one offloaded array controller function; and, an SAS expander.

An embodiment of the invention may therefore further comprise a storage system, comprising: an array controller; a JBOD unit comprising an IOC including a CPU and a non-volatile memory, the IOC configured to perform at least one offloaded array controller function; and, an SAS expander.

DETAILED DESCRIPTION OF THE EMBODIMENTS

Figure 1:
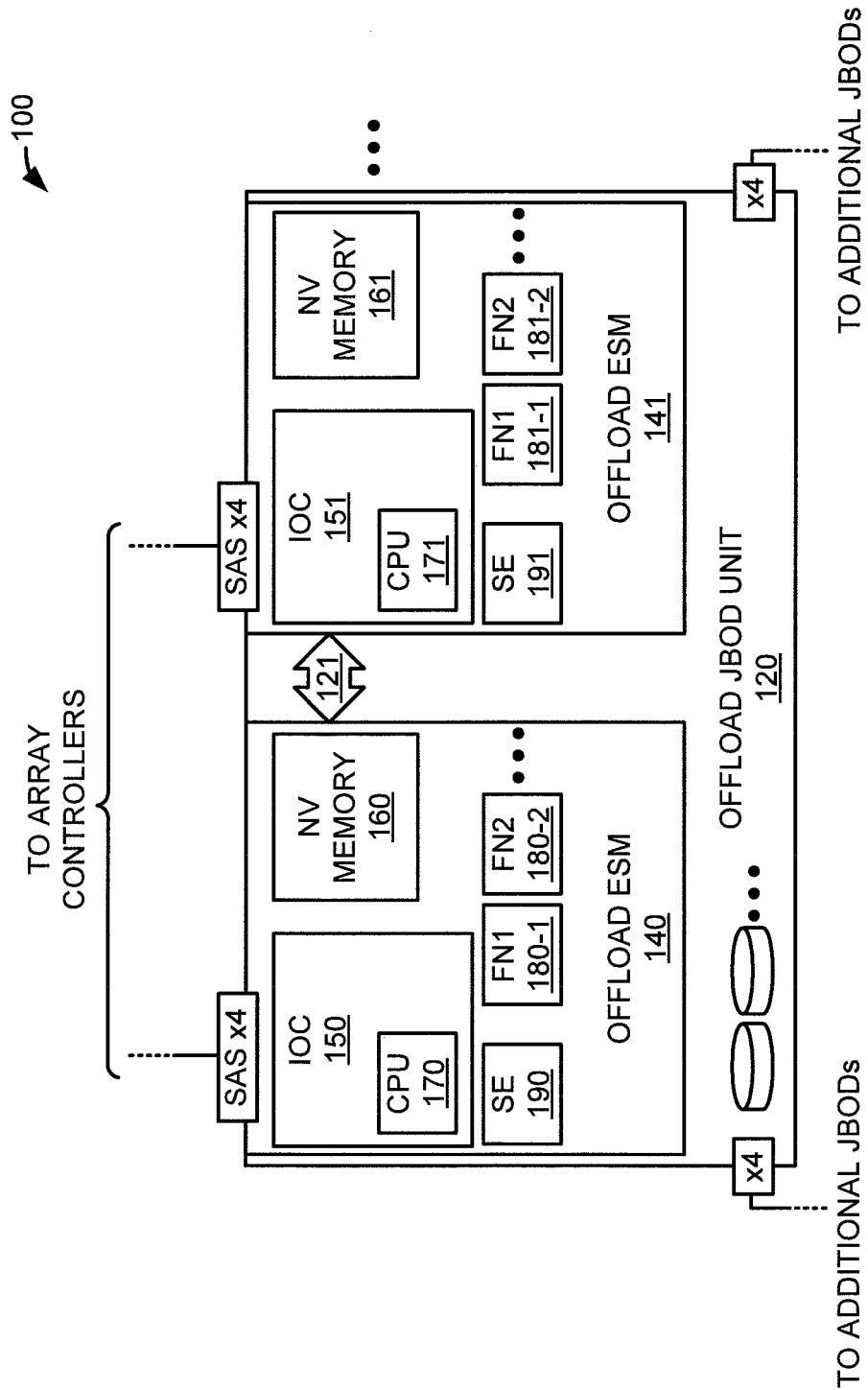
FIG. 1 is a block diagram of a storage array assist unit.

FIG. 1 is a block diagram of a storage array assist unit. Storage array system 100 comprises offload just a bunch of disks (JBOD) unit 120, array controllers (not shown), and additional JBOD units (not shown). In FIG. 1, offload JBOD unit 120 may be coupled to multiple array controllers via serial attached SCSI (SAS) ports. Offload JBOD unit 120 may be coupled to additional JBOD units by SAS ports. Offload JBOD units 120 may include disk drives.

Offload JBOD unit 120 includes offload environmental service module (ESM) 140 and offload ESM 141. Offload ESM 140 comprises input/output controller (IOC) 150, nonvolatile memory (NV memory) 160, SAS expander (SE) 190, and assist functions 180-1, 180-2. IOC 150 may include CPU 170. Offload ESM 141 comprises IOC 151, nonvolatile memory 161, SAS expander 191, and assist functions 181-1, 181-2. IOC 151 may include CPU 171. Offload ESM 140 and offload ESM 141 may be coupled by link 121 so that they may exchange data. Offload ESM 140 and offload ESM 141 provide expander and environmental services monitoring and management functions. Assist functions 180-1 and 180-2 may be collectively referred to herein as assist function(s) 180. Assist functions 181-1 and 181-2 may be collectively referred to herein as assist function(s) 181.

In an embodiment, offload ESM 140 and offload ESM 141 may include assist functions 180-1, 180-2, 181-1 and 181-2 that may include parity and ECC generation, battery backed data memory, NVRAM, and inter-controller write caching. These assist functions may be performed by dedicated hardware, additional processors, software, or a combination of hardware and software. For example, NV memory 160 and NV memory 161 may allow for nonvolatile caching of write data. This data may be mirrored between NV memory 160 and NV memory 161, thus providing for redundant storage of this cached data. NV memory 160 and NV memory 161 may provide commit to disk capability.

The special assist functions of offload JBOD 120 may be leveraged by data protection layer (DPL) software. DPL software may be run on the array controllers. The assist functionality may be implemented by configuring IOC 150 and IC 151 as SAS targets. Embedded CPUs 170 and 171, or embedded CPU's in assist functions 180 and 181 may provide processing capability. NV Memories 160 and 161 can provide storage that survives power failures, system shutdowns, etc. NV memories 160 and 161 may be flash, battery backed memory, or the like. Note that IOC 150, embedded CPU 170, and SAS expander 190 may be incorporated in the same ASIC. Likewise, IOC 151, embedded CPU 171, and SAS expander 191 may be incorporated in the same ASIC.

Storage array system 100 may contain nonvolatile memory, such as NV memory 160 and NV memory 161, in order to perform write cache I/O processing. Write cache I/O processing ensures that data will be preserved in the event of a power failure or I/O disruption. In storage array system 100, write data may be written by the array controller to NV memory 160 or 161 in offload JBOD unit 120 using, for example, SCSI and/or RDMA commands. Once the data is written to NV memory 160 or 161, the data would be considered persistent and an array controller would be able to return this status to the host. Offload ESM 140 or 141 may implement a forked write capability that writes the data to NV memory 160 or 161, respectively, as well as duplicating the data and sending it to the other offload ESM's NV memory 161 or 160, respectively. This write data may be exchanged between offload ESMs 140 and 141 via link 121. Link 121 may be, for example, an SAS, PCIe, or Infiniband connection. Other types of links are contemplated.

Storage array system 100 may mirror write cached data to multiple offload ESMs 140-141 to ensure that data persists through the failure of the storage array controller, offload ESM, offload JBOD, or any combination thereof. In such an event, an alternate controller, JBOD, or offload ESM is able to reclaim the data that was mirrored to it as part of the redundancy failover mechanism.

In an embodiment, offload JBOD unit 120 may be used by an array controller to create a mirror of the data to a second NV memory 160 or 161. This NV memory 160 or 161 may either be in the other offload ESM 140 or 141 in the same offload JBOD unit 120, or in another offload JBOD unit in the system (not shown). In another embodiment, NV memory 160 and 161 in offload JBOD unit 120 may be used to mirror of the memory in the array controller itself.

NV memory 160 or 161 may also be used to store configuration metadata that describes how storage array system 100 should be configured during initialization. This may speed the power on sequence or indicate specific operating environments (for example, host type, default settings, etc.).

When a storage array controller is ready to commit write back cached data to disk, offload JBOD 120 may be issued a special command that instructs CPU 170 or 171 to transfer write back cached data stored in the NV memory 160 or 161 to the appropriate disk location in the SAS domain. The offload ESM 140 or 141 receiving this command may receive the memory address of the data, the I/O device (e.g., magnetic disk or solid state disk), the LBA to be written to, and the length of the data to be written. Once the command has been received, the offload ESM 140 or 141 may issue the appropriate SCSI or SATA command to the I/O device. Once status has been received confirming the I/O device has completed the operation, the offload ESM 140 or 141 may mark the write back cached data as no longer dirty, and return status to the storage array controller.

In another embodiment, offload ESM 140 or 141 may be used as a target device that presents a single target for the disks in offload JBOD unit 120, and the other JBODs in the same SAS domain, as logical unit numbers (LUNs) to the storage array controller. This may speed the discovery of the storage array controller during many power on and reset conditions.

Assist functions 180 and 181 may provide a hardware and/or software function that assists in calculating redundant data for implementing RAID techniques across disk drives. Assist functions 180 and 181 may provide a hardware and/or software function that assists in performing regular expression searching. This regular expression searching may be used for such functions as deep packet inspection (DPI) or virus signature recognition. Assist functions 180 and 181 may provide a hardware and/or software function that assists in calculating a hash function to assist with de-duplication. Assist function 180 and 181 may provide XOR, ECC, compression functions. Assist functions 180 and 181 may provide other a hardware and/or software functions.

Figure 2:
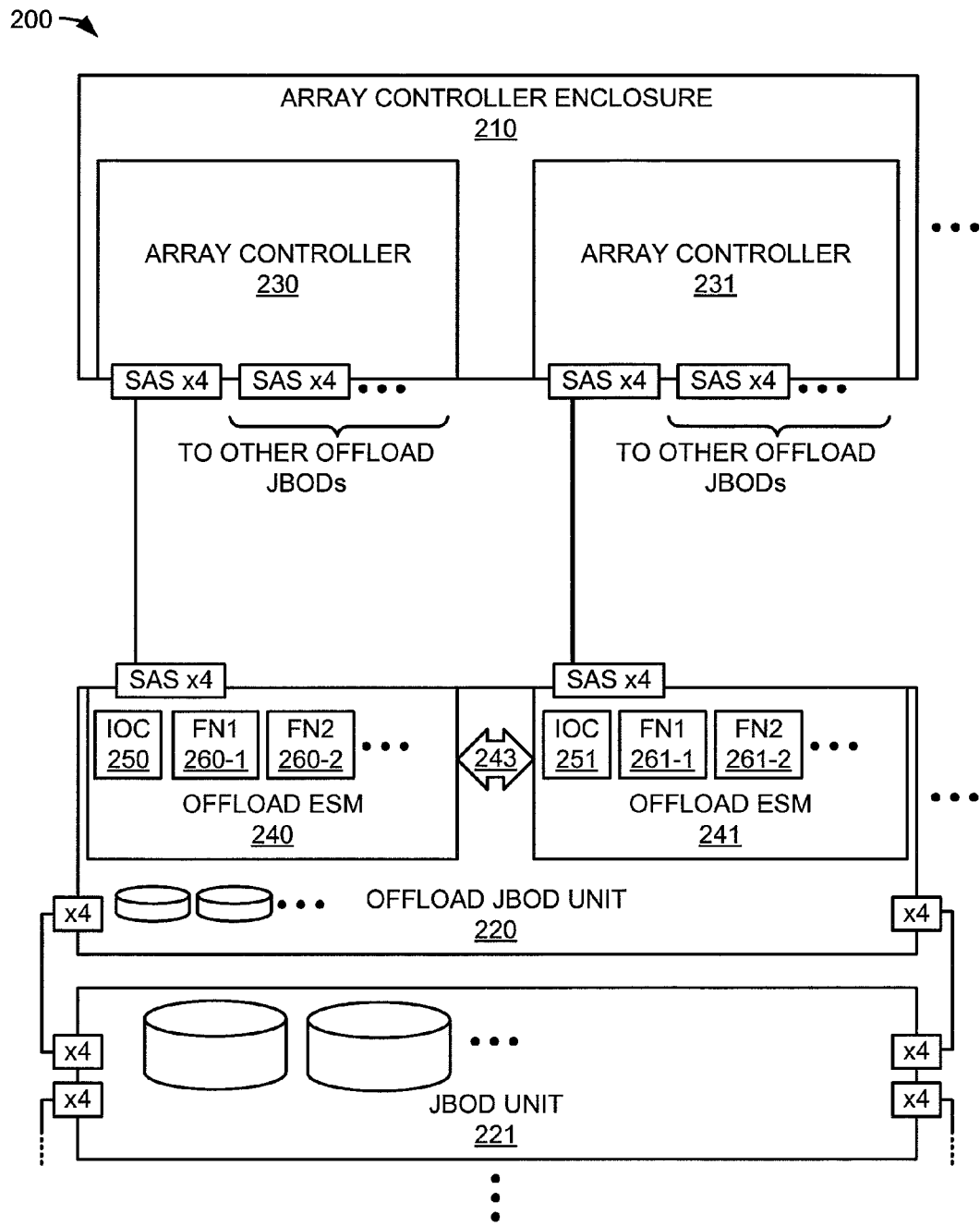
FIG. 2 is a block diagram of a storage array assist architecture.

FIG. 2 is a block diagram of a storage array hardware assist architecture. In FIG. 2, storage array system 200 comprises offload JBOD unit 220, array controller enclosure 210, and additional JBOD unit 221. Offload JBOD unit 220 may also be known as an environmental service module (ESM). In FIG. 2, offload JBOD unit 220 may be coupled to multiple array controllers via SAS ports. Offload JBOD unit 220 may be coupled to JBOD unit 221 by SAS ports. Offload JBOD unit 220 and JBOD unit 221 may include disk drives. Array controller enclosure 210 or offload JBOD unit 220 may include one or more SAS expanders.

Array controller enclosure 210 may include multiple array controllers 230-231. Each of these array controllers 230-231 may be coupled to offload JBOD unit 220. Array controllers 230-231 may be coupled to offload ESMs 240-241 in offload JBOD unit 220 via one or more SAS ports.

Offload JBOD unit 220 includes offload ESM 240 and offload ESM 241. Offload ESM 240 comprises IOC 250, assist function 260-1, and assist function 260-2. Offload ESM 240 comprises IOC 250, assist function 261-1, and assist function 261-2. Offload ESM 240 and offload ESM 241 may be coupled by link 243 so that they may exchange data and information. Assist functions 260-1 and 260-2 may be collectively referred to herein as assist function(s) 260. Assist functions 261-1 and 261-2 may be collectively referred to herein as assist function(s) 261.

In an embodiment, offload ESM 240 and offload ESM 241 may include assist functions 260-261 that may include parity and ECC generation, battery backed data memory, NVRAM, and inter-controller write caching. These assist functions may be performed by dedicated hardware, additional processors, software, or a combination of hardware and software. For example, assist function 260-1 may include NV memory. This NV memory may allow for nonvolatile caching of write data. This data may be mirrored between offload ESM 240 and 241, thus providing for redundant storage of this cached data.

The special assist functions 260-261 of offload JBOD 220 may be leveraged by data protection layer (DPL) software. This functionality may be implemented by configuring IOC 250 and IOC 251 as SAS targets. In addition, IOCs 250 and 251 may provide processing capability. NV memories in assist functions 260-261 can provide storage that survives power failures, system shutdowns, etc.

Array controllers 230 and 231 may contain nonvolatile memory in order to perform write cache I/O processing. This may ensure that data will be preserved in the event of a power failure or I/O disruption. In storage array system 200, write data may be written by array controller 230 or 231 to assist functions 260-261 in offload JBOD unit 220 using, for example, SCSI and/or RDMA commands. Once the data is written to an assist function 260-261 in offload JBOD unit 220, the data may be considered persistent. Thus, array controller 230 or 231 may be able to return status for the I/O to the host. Offload ESM 240 or 241 may implement a forked write capability that writes the data to an assist function 260, as well as duplicating the data and sending it to NV memory in the other offload ESM 241. This write data may be exchanged between offload ESMs 240 and 241 via link 243. Link 243 may be, for example, an SAS, PCIe, or Infiniband connection. Other types of links are contemplated.

Storage array system 200 may mirror write cached data to array controller 230 and array controller 231 to ensure that data persists through the failure of an array controller 230 or 231. In such an event, the alternate controller is able to reclaim the data that was mirrored to it as part of the redundancy failover mechanism when the first controller fails.

In an embodiment, offload JBOD unit 220 may be used by an array controller 230 or 231 to create a mirror of the data to an NV memory in an assist function 260-261. This NV memory may either be in the other offload ESM 240 or 241 in the same offload JBOD unit 220, or another offload JBOD unit in the system (not shown). In another embodiment, offload JBOD unit 220 may be used as a mirror of the memory in the array controller 230 or 231 itself.

Assist function 260-261 may also be used for configuration metadata that describes how storage array system 200 should be configured during initialization. This may speed the power on sequence or indicate specific operating environments (for example, host type, default settings, etc.).

When a storage array controller 230 or 231 is ready to commit write back cached data to disk, offload JBOD unit 220 may be issued a special command that instructs it to transfer write back cached data stored in an assist function 260-261 to an appropriate disk in the SAS domain. The offload ESM 240 or 241 receiving this command may receive the memory address of the data, the I/O device (magnetic disk or solid state disk), the LBA to be written to, and the length of the data to be written. Once the command has been received, the offload ESM 240 or 241 may issue the appropriate SCSI or SATA command to the I/O device. Once status has been received confirming the I/O device has completed the operation, the offload ESM 240 or 241 may mark the write back cached data as no longer dirty, and return status to the array controller 230 or 231.

In another embodiment, offload ESM 240 or 241 may be used as a target device that presents a single target for the disks in offload JBOD unit 220, and the other JBODs in the same SAS domain, as LUNs to the storage array controller. This may speed in discovery of the storage array controller during many power on and reset conditions.

Assist functions 180 and 181 may provide a hardware and/or software function that assists in calculating redundant data for implementing RAID techniques across disk drives. Assist functions 260 and 261 may provide a hardware and/or software function that assists in performing regular expression searching. This regular expression searching may be used for such functions as deep packet inspection (DPI) or virus signature recognition. Assist functions 260 and 261 may provide a hardware and/or software function that assists in calculating a hash function to assist with de-duplication. Assist functions 260 and 261 may provide XOR, ECC, compression functions. Assist functions 260 and 261 may provide other a hardware and/or software functions.

The systems, units, drives, devices, equipment, and functions described above may be implemented with or executed by one or more computer systems. The methods described above may also be stored on a computer readable medium. Many of the elements of storage array system 100, and storage array system 200 may be, comprise, or include computers systems. This includes, but is not limited to, offload JBOD 120, offload ESM 140, offload ESM 141, IOC 150, IOC 151, CPU 170, CPU 171, SAS expander 190, SAS expander 191, assist functions 180-1, 180-2, 181-1, 181-2, array controller 230, array controller 231, offload JBOD unit 220, JBOD unit 221, offload ESM 240, offload ESM 241, IOC 250, IOC 251, assist functions 260-261, and any disk drives encompassed in storage array system 100 or storage array system 200.

Figure 3:
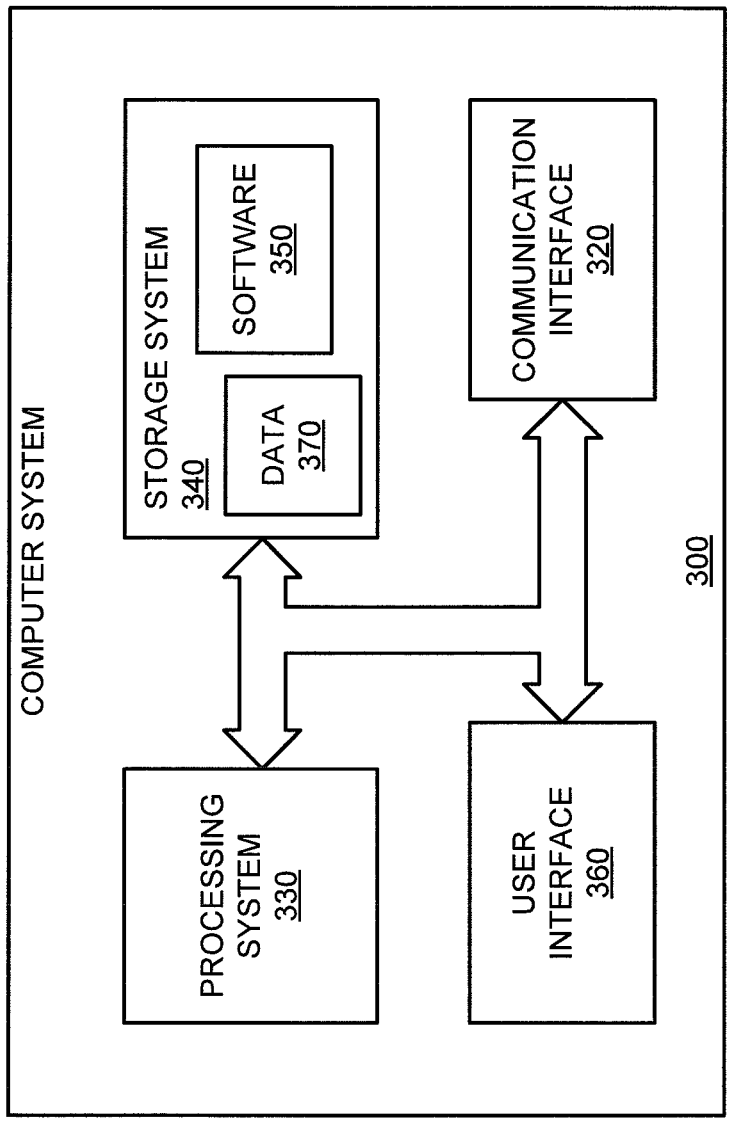
FIG. 3 is a block diagram of a computer system.

FIG. 3 illustrates a block diagram of a computer system. Computer system 300 includes communication interface 320, processing system 330, storage system 340, and user interface 360. Processing system 330 is operatively coupled to storage system 340. Storage system 340 stores software 350 and data 370. Processing system 330 is operatively coupled to communication interface 320 and user interface 360. Computer system 300 may comprise a programmed general-purpose computer. Computer system 300 may include a microprocessor. Computer system 300 may comprise programmable or special purpose circuitry. Computer system 300 may be distributed among multiple devices, processors, storage, and/or interfaces that together comprise elements 320-370.

Communication interface 320 may comprise a network interface, modem, port, bus, link, transceiver, or other communication device. Communication interface 320 may be distributed among multiple communication devices. Processing system 330 may comprise a microprocessor, microcontroller, logic circuit, or other processing device. Processing system 330 may be distributed among multiple processing devices. User interface 360 may comprise a keyboard, mouse, voice recognition interface, microphone and speakers, graphical display, touch screen, or other type of user interface device. User interface 360 may be distributed among multiple interface devices. Storage system 340 may comprise a disk, tape, integrated circuit, RAM, ROM, network storage, server, or other memory function. Storage system 340 may be a computer readable medium. Storage system 340 may be distributed among multiple memory devices.

Processing system 330 retrieves and executes software 350 from storage system 340. Processing system may retrieve and store data 370. Processing system may also retrieve and store data via communication interface 320. Processing system 350 may create or modify software 350 or data 370 to achieve a tangible result. Processing system may control communication interface 320 or user interface 370 to achieve a tangible result. Processing system may retrieve and execute remotely stored software via communication interface 320.

Software 350 and remotely stored software may comprise an operating system, utilities, drivers, networking software, and other software typically executed by a computer system. Software 350 may comprise an application program, applet, firmware, or other form of machine-readable processing instructions typically executed by a computer system. When executed by processing system 330, software 350 or remotely stored software may direct computer system 300 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A storage system comprising:

a first storage array controller;

a second storage array controller in an enclosure with the first array controller;

a first offload environmental service module (ESM) in communication with, and separate from, the first and second storage array controllers; the first offload ESM having an input/output controller (IOC) configured as a serial attached SCSI (SAS) target, the IOC configured to operatively communicate with the first and second array controllers using SAS protocol, further wherein the IOC is configured to perform at least one function of the first and second array controllers that has been offloaded from the first or second storage array controller to the first offload ESM; and a second offload ESM in communication with, and separate from, the first and second storage array controllers and also in communication with the first offload ESM;

the first offload ESM including non-volatile memory, where the first offload ESM is configured to create a mirror of data in one or both of the first and second storage controllers and also configured to create a mirror of data in the second offload ESM, further wherein the first and second offload ESMs provide environmental services monitoring and management functions and are separate from the first and second storage array controllers, further wherein the non-volatile memory stores configuration metadata that describes an initialization configuration for the storage system to speed a power on sequence.

2. The storage system of claim 1, wherein the at least one offloaded array controller function comprises write cache input/output (I/O) processing.

3. The storage system of claim 2, wherein write data is received by the first offload ESM via SCSI commands.

4. The storage system of claim 2, wherein write data is received by the first offload ESM via RDMA commands.

5. The storage system of claim 1, wherein the offload ESM stores configuration information in the non-volatile memory.

6. The storage system of claim 1, wherein the offload ESM stores and tracks data to be written and confirms I/O devices complete write operations.

7. A storage system comprising:
   a first storage array controller;
   a second storage array controller in an enclosure with the first array controller; and
   A JOBOD unit comprising:
      a first offload environmental service module (ESM) in communication with, and separate from, the first and second storage array controllers; the first offload ESM having an input/output controller (IOC) configured as a serial attached SCSI (SAS) target, the IOC configured to operatively communicate with the first and second array controllers using SAS protocol, further wherein the IOC is configured to perform at least one function of the first and second array controllers that has been offloaded from the first or second storage array controller to the first offload ESM; and
      a second offload ESM in communication with, and separate from, the first and second storage array controllers and also in communication with the first offload ESM;
      the first offload ESM including non-volatile memory, where the first offload ESM is configured to create a mirror of data in one or both of the first and second storage controllers and also configured to create a mirror of data in the second offload ESM, further wherein the first and second offload ESMs provide environmental services monitoring and management functions and are separate from the first and second storage array controllers, further wherein the non-volatile memory stores configuration metadata that describes an initialization configuration for the storage system to speed a power on sequence.

8. The storage system of claim 7, wherein the IOC represents multiple devices in an SAS domain.

9. The storage system of claim 7, wherein the IOC performs write cache input/output (I/O) processing.

10. The storage system of claim 9, wherein the IOC receives write data via SCSI commands.

11. The storage system of claim 9, wherein the IOC receives write data via RDMA commands.

12. The storage system of claim 7, wherein the IOC stores configuration information in the non-volatile memory.

13. The storage system of claim 7, wherein the IOC stores and tracks data to be written and confirms I/O devices complete write operations.

* * * * *